(12) United States Patent
Coon

(10) Patent No.: US 6,373,663 B1
(45) Date of Patent: Apr. 16, 2002

(54) ULTIMATE LOW COST DISK DRIVE SUSPENSION SYSTEM

(75) Inventor: Warren Coon, Temecula, CA (US)

(73) Assignee: Magnecomp Corp., Temecula, CA (US)

( * ) Notice: Subject to any disclaimer, the term of this patent is extended or adjusted under 35 U.S.C. 154(b) by 50 days.

(21) Appl. No.: 09/592,143

(22) Filed: Jun. 12, 2000

Related U.S. Application Data

(60) Provisional application No. 60/185,195, filed on Feb. 25, 2000.

(51) Int. Cl.[7] .................................................. G11B 12/16
(52) U.S. Cl. .................................................... 360/245.5
(58) Field of Search ..................................... 360/245.5

(56) References Cited

U.S. PATENT DOCUMENTS 4,399,476 A * 8/1983 King .......................... 360/104
4,616,279 A * 10/1986 Poorman ..................... 360/103
5,282,102 A * 1/1994 Christianson ............... 360/104
5,617,274 A * 4/1997 Ruiz ........................... 360/104

FOREIGN PATENT DOCUMENTS

JP          5-314630      * 11/1993

* cited by examiner

*Primary Examiner*—David Davis
(74) *Attorney, Agent, or Firm*—Louis J. Bachand

(57) ABSTRACT

A very low cost disk drive suspension is a unitary structure carried in a strip with other structures that comprise a load beam and a flexure, the flexure having a head portion that forms a gimballing platform from inner and outer leaves carried on a frame leg, the load beam having an aperture with guiding fingers to receive and guide an axial connector that can be coined to mount the load beam on an actuator arm in lieu of using a mounting plate.

12 Claims, 2 Drawing Sheets

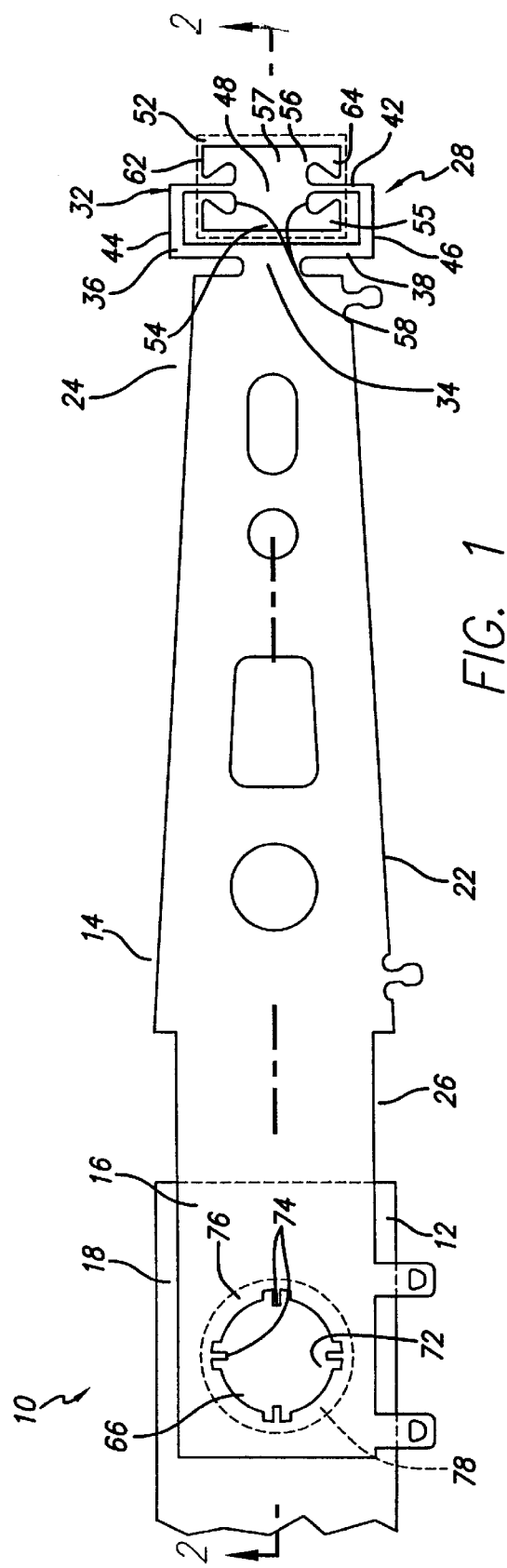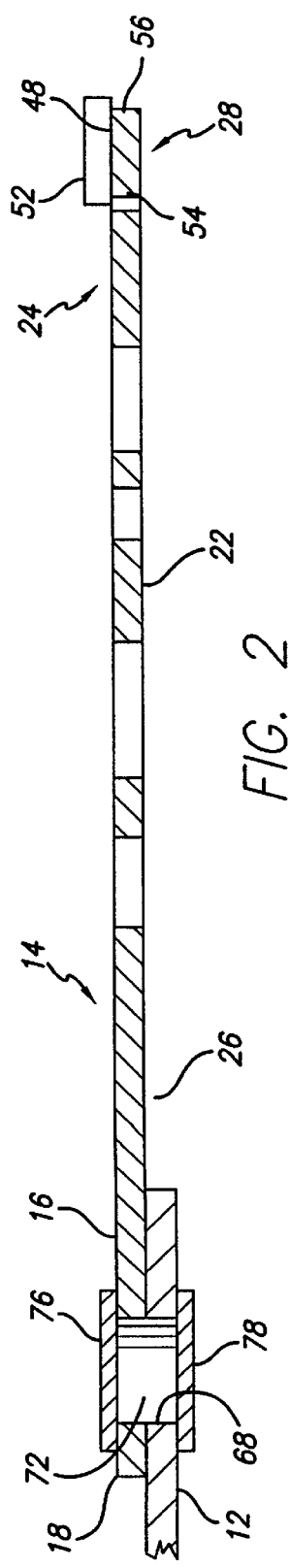

ULTIMATE LOW COST DISK DRIVE SUSPENSION SYSTEM

CROSS-REFERENCE TO RELATED APPLICATIONS

This application claims the benefit of U.S. Provisional Application Ser. No. 60/185,195, filed Feb. 25, 2000.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to disk drive suspensions, and more particularly to an ultra low cost suspension comprising a unitary load beam and flexure structure provided on a strip for further assembly of the suspension with conductors and formation of rails, and having a novel, mounting plate-free attachment arrangement and integrated dimple free flexure platform for carrying a slider.

2. Description of the Related Art

Typically, disk drive suspensions have several cost-increasing assembly steps and component additions that are desirably eliminated or reduced in scope or number in order to meet the demand for the ultimate inexpensive suspension.

BRIEF SUMMARY OF THE INVENTION

It is an object of the invention, therefore, to provide the ultimate inexpensive suspension. It is a further object to provide a suspension having a one-piece flexure and load beam and a highly simplified mounting. A further object is to provide as part of the flexure a head having inner and outer leaves carried in a frame for slider support.

This and other objects of the invention to become apparent hereinafter are realized in a low cost disk drive suspension system comprising a one-piece flexure and load beam structure adapted for mounting plate-free mounting to an actuator arm and having an elongated load beam portion having a longitudinal axis and a base section at its proximate end, a rigid section at its distal end, and a spring section between the base and rigid sections, and a flexure portion at the load beam distal end, the flexure portion comprising a head connected to the load beam distal end by a neck extension of the load beam distal end, the flexure portion head comprising a generally rectangular interiorly open frame having its longitudinal axis disposed normal to the load beam longitudinal axis, the frame comprising opposed inner and outer transversely disposed legs connected by opposed left and right longitudinally disposed side legs, the frame inner leg being joined to the neck, the flexure portion head further comprising a platform adapted to support a slider, the platform comprising an inner leaf within the frame and an outer leaf without the frame, the leaves being attached to and separated by the frame outer leg in gimballing relation.

In this and like embodiments, typically, the entirety of the structure is etched from a single sheet of metal foil, the platform inner and outer leaves are mirror images and comprise respectively inner and outer rectangles extending from the frame outer leg and disposed normal to the load beam longitudinal axis, the rectangles being centered on the load beam longitudinal axis and having a length substantially equal to the width of the load beam distal end, each the rectangle being relieved at its locus of attachment to the frame outer leg to free each the rectangle of attachment to the frame outer leg from the outer left and right edges of the rectangle inward to a center locus of each the rectangle having the width of the neck, the load beam base section defines a base section mounting hole adapted to register with an actuator arm mounting hole and receive an axially extended connector for connecting the structure to the actuator arm, the base section mounting hole having circularly distributed fingers extending radially into the base section mounting hole in connector guiding relation, and, the connector has a first terminal flange at one end and a second terminal flange at the other end, the second terminal flange being formed in situ after assembly of the structure with the load beam.

In a further embodiment, the invention provides a low cost disk drive suspension system comprising a series of planar, unitary structures comprising a load beam and flexure formed from a common single sheet material on a common mounting strip, each the structure comprising an elongated load beam portion having a longitudinal axis and a base section at its proximate end, a rigid section at its distal end, and a spring section between the base and rigid sections, the rigid section having rail members lying in the plane of the rigid section adapted for subsequent turning up or down to be normal to the rigid section, and a flexure portion at the load beam distal end, the flexure portion comprising a head connected to the load beam distal end by a neck extension of the load beam distal end, the flexure portion head comprising a generally rectangular, interiorly open frame having its longitudinal axis disposed normal to the load beam longitudinal axis and comprising opposed inner and outer legs spaced from and parallel to the frame longitudinal axis, the inner and outer legs being connected by opposed left and right side legs disposed normal to the frame longitudinal axis and parallel to the load beam longitudinal axis, the frame inner leg being joined to the neck, the flexure portion head further comprising a platform adapted to support a slider, the platform comprising an inner leaf within the frame and an outer leaf without the frame, the leaves being attached to and separated by the frame outer leg in gimballing relation, wire supports along the side of the load beam, wire conductors supported at the wire supports, a slider mounted to the platform and electrically connected to the wire conductors.

In this and like embodiments, typically, each structure load beam is free of a final gram adjustment, the platform inner and outer leaves are mirror images and comprise respectively inner and outer rectangles extending from the frame outer leg and disposed normal to the load beam longitudinal axis, the rectangles being centered on the load beam longitudinal axis and having a length substantially equal to the width of the load beam distal end, each the rectangle being relieved at its locus of attachment to the frame outer leg to free each the rectangle of attachment to the frame outer leg from the outer left and right edges of the rectangle inward to a center locus of each the rectangle having the width of the neck, and, the load beam base section defines a base section mounting hole adapted to register with an actuator arm mounting hole and receive an axially elongated connector having a first terminal at one end and a second terminal at the other end to be formed in situ after assembly of the structure with an actuator arm, the base section mounting hole having circularly distributed fingers extending radially into the base section mounting hole for guiding the connector.

BRIEF DESCRIPTION OF THE SEVERAL VIEWS OF THE DRAWINGS

The invention will be further described in conjunction with the attached drawings in which:

FIG. 1 is a plan view of the invention suspension load beam and flexure structure and connector;

FIG. 2 is a view taken on line 2—2 in FIG. 1; and,

DETAILED DESCRIPTION OF THE INVENTION

Figure 3:
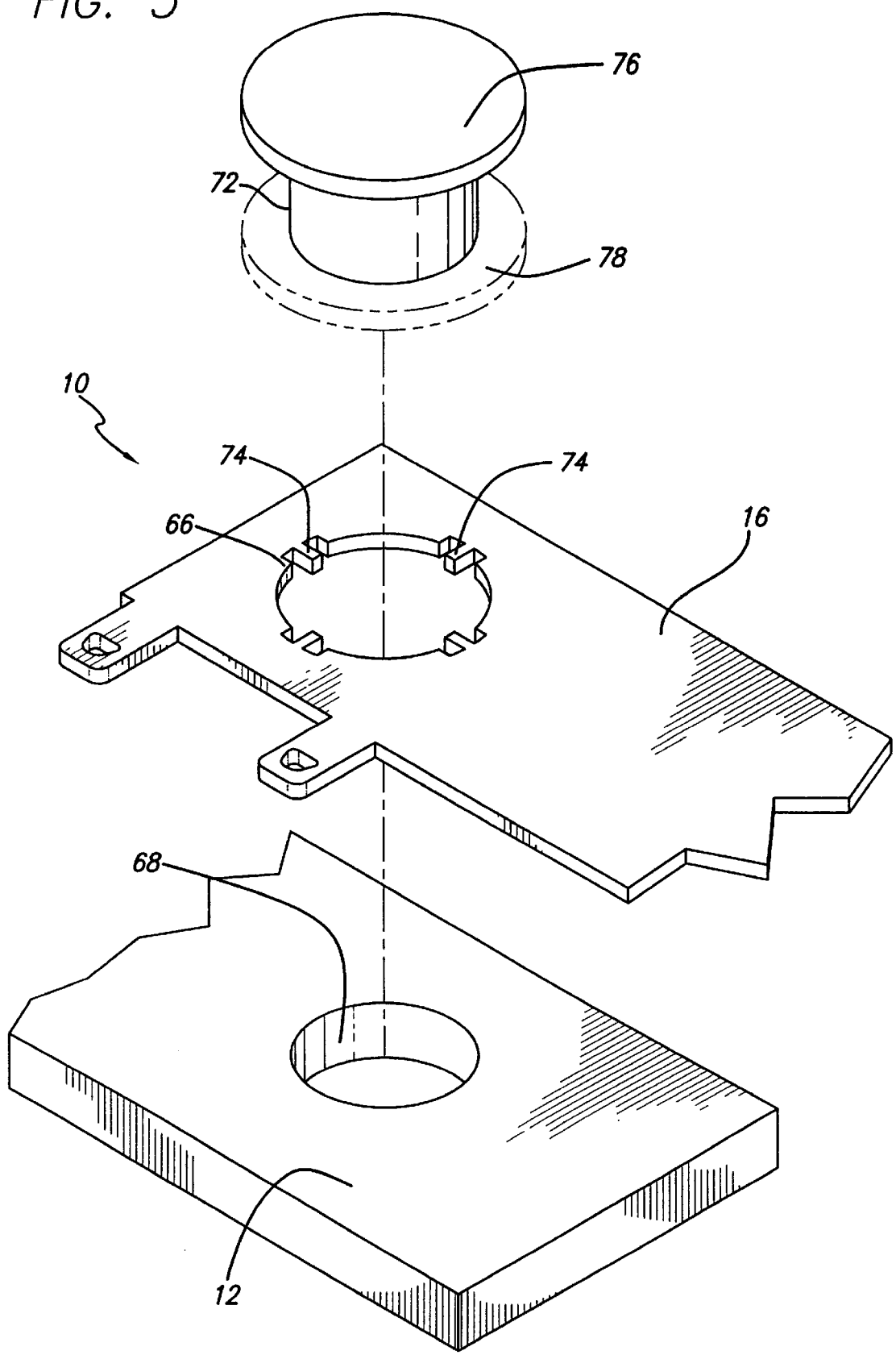
FIG. 3 is an exploded view of the invention.

The present disk drive suspension system comprises a one-piece flexure and load beam structure 10 adapted for mounting plate-free mounting to an actuator arm 12. The structure 10 comprises an elongated load beam portion 14 having a longitudinal axis and a base section 16 at its proximate end 18, a rigid section 22 at its distal end 24, and a spring section 26 between the base and rigid sections. The structure 10 further comprises a flexure portion 28 at the load beam distal end 24. The flexure portion comprises a head 32 connected to the load beam distal end 24 by a neck extension 34 of the load beam distal end. The flexure portion head 32 comprises a generally rectangular interiorly open frame 36 having its longitudinal axis disposed normal to the load beam longitudinal axis. The frame 36 comprises opposed inner and outer transversely disposed legs 38, 42 connected by opposed left and right longitudinally disposed side legs 44, 46. The frame inner leg 38 is joined to the neck extension 34.

The flexure portion head 32 further comprises a platform 48 adapted to support a slider 52. The platform 48 comprises an inner leaf 54 within the frame 36 and an outer leaf 56 without the frame. The leaves 54, 56 are attached to and separated by the frame outer leg 42 in gimballing relation.

The entirety of the structure 10 is etched from a single sheet of metal foil. The platform inner and outer leaves 54, 56 are mirror images and comprise respectively inner and outer rectangles 55, 57 extending from the frame outer leg 42 and disposed normal to the load beam longitudinal axis. The rectangles 55, 57 are centered on the load beam longitudinal axis and have a length substantially equal to the width of the load beam distal end 24. Each rectangle 55, 57 is relieved at its locus of attachment 58 to the frame outer leg 42 to free each rectangle of attachment to the frame outer leg from the outer left and right edges 62, 64 of the rectangles inward to a center locus of each rectangle having the width of the neck extension 34.

The load beam base section 16 defines a base section mounting hole 66 adapted to register with the actuator arm mounting hole 68 and receive an axially extended connector 72 for connecting the structure 10 to the actuator arm 12. The base section mounting hole 66 has a series of circularly distributed fingers 74 extending radially into the hole in connector 72 guiding relation. The connector 72 is like a grommet and has a first terminal flange 76 at one end and a second terminal flange 78 at the other end, the second terminal flange being formed in situ after assembly of the structure with the load beam and flexure structure 10.

The foregoing objects are thus met.

I claim:

1. A low cost disk drive suspension system comprising a one-piece flexure and load beam structure adapted for mounting plate-free mounting to an actuator arm and having an elongated load beam portion having a longitudinal axis and a base section at the load beam proximate end, a rigid section at the load beam distal end, and a spring section between said base and rigid sections, and a flexure portion at said load beam distal end, said flexure portion comprising a head connected to said load beam distal end by a neck extension of said load beam distal end, said flexure portion head comprising a generally rectangular interiorly open frame having a frame longitudinal axis disposed normal to said load beam longitudinal axis, said frame comprising opposed inner and outer transversely disposed legs connected by opposed left and right longitudinally disposed side legs, said frame inner leg being joined to said neck, said flexure portion head further comprising a platform adapted to support a slider, said platform comprising an inner leaf within said frame and an outer leaf without said frame, said leaves being attached to and separated by said frame outer leg in gimballing relation.

2. The low cost disk drive suspension system one-piece flexure and load beam structure according to claim 1, in which the entirety of said structure is etched from a single sheet of metal foil.

3. The low cost disk drive suspension system one-piece flexure and load beam structure according to claim 2, in which said platform inner and outer leaves are mirror images and comprise respectively inner and outer rectangles extending from said frame outer leg and disposed normal to said load beam longitudinal axis, said rectangles being centered on said load beam longitudinal axis and having a length substantially equal to the width of said load beam distal end, each said rectangle being relieved at its locus of attachment to said frame outer leg to free each said rectangle of attachment to said frame outer leg from the outer left and right edges of said rectangle inward to a center locus of each said rectangle having the width of said neck.

4. The low cost disk drive suspension system one-piece flexure and load beam structure according to claim 1, in which said platform inner and outer leaves are mirror images and comprise respectively inner and outer rectangles extending from said frame outer leg and disposed normal to said load beam longitudinal axis, said rectangles being centered on said load beam longitudinal axis and having a length substantially equal to the width of said load beam distal end, each said rectangle being relieved at its locus of attachment to said frame outer leg to free each said rectangle of attachment to said frame outer leg from the outer left and right edges of said rectangle inward to a center locus of each said rectangle having the width of said neck.

5. The low cost disk drive suspension system one piece load beam and flexure structure according to claim 1, in which said load beam base section defines a base section mounting hole adapted to register with an actuator arm mounting hole and receive an axially extended connector for connecting said structure to said actuator arm, said base section mounting hole having circularly distributed fingers extending radially into said base section mounting hole in connector guiding relation.

6. The low cost disk drive suspension system one piece load beam and flexure structure according to claim 1, in which said connector has a first terminal flange at one end and a second terminal flange at the other end, said second terminal flange being formed in situ after assembly of said structure with said load beam.

7. The low cost disk drive suspension system one piece load beam and flexure structure according to claim 6, in which said load beam base section defines a base section mounting hole adapted to register with an actuator arm mounting hole and receive an axially extended connector for connecting said structure to said actuator arm, said base section mounting hole having circularly distributed fingers extending radially into said base section mounting hole in connector guiding relation.

8. The low cost disk drive suspension system one piece load beam and flexure structure according to claim 7, in which said connector has a first terminal flange at one end and a second terminal flange at the other end, said second terminal flange being formed in situ after assembly of said structure with said load beam.

9. A low cost disk drive suspension system comprising a series of planar, unitary structures comprising a load beam and flexure formed from a common single sheet material on a common mounting strip, each said structure comprising an elongated load beam portion having a longitudinal axis and a base section at the load beam proximate end, a rigid section at the load beam distal end, and a spring section between said base and rigid sections, said rigid section having rail members lying in the plane of said rigid section adapted for subsequent turning up or down to be normal to said rigid section, and a flexure portion at said load beam distal end, said flexure portion comprising a head connected to said load beam distal end by a neck extension of said load beam distal end, said flexure portion head comprising a generally rectangular, interiorly open frame having a frame longitudinal axis disposed normal to said load beam longitudinal axis and comprising opposed inner and outer legs spaced from and parallel to said frame longitudinal axis, said inner and outer legs being connected by opposed left and right side legs disposed normal to said frame longitudinal axis and parallel to said load beam longitudinal axis, said frame inner leg being joined to said neck, said flexure portion head further comprising a platform adapted to support a slider, said platform comprising an inner leaf within said frame and an outer leaf without said frame, said leaves being attached to and separated by said frame outer leg in gimballing relation, wire supports along the side of said load beam, wire conductors supported at said wire supports, a slider mounted to said platform and electrically connected to said wire conductors.

10. The disk drive suspension system according to claim 9, in which each said structure load beam is free of a final gram adjustment.

11. The disk drive suspension system according to claim 10, in which said platform inner and outer leaves are mirror images and comprise respectively inner and outer rectangles extending from said frame outer leg and disposed normal to said load beam longitudinal axis, said rectangles being centered on said load beam longitudinal axis and having a length substantially equal to the width of said load beam distal end, each said rectangle being relieved at its locus of attachment to said frame outer leg to free each said rectangle of attachment to said frame outer leg from the outer left and right edges of said rectangle inward to a center locus of each said rectangle having the width of said neck.

12. The disk drive suspension system according to claim 11, in which said load beam base section defines a base section mounting hole adapted to register with an actuator arm mounting hole and receive an axially elongated connector having a first terminal at one end and a second terminal at the other end to be formed in situ after assembly of the structure with an actuator arm, said base section mounting hole having circularly distributed fingers extending radially into said base section mounting hole for guiding said connector.

* * * * *